United States Patent
Brenden et al.

[15] 3,683,679
[45] Aug. 15, 1972

[54] ULTRASONIC INTERFERENCE PATTERN DETECTOR

[72] Inventors: Byron B. Brenden, 1206 Cedar St.; Russell B. Kidman, 1408 Thayer Dr., both of Richland, Wash. 99352

[22] Filed: Aug. 22, 1969

[21] Appl. No.: 852,444

[52] U.S. Cl. ............................73/67.5 H, 340/5 H
[51] Int. Cl. ...................................G01n 29/04
[58] Field of Search...............73/67.5, 67.5 H, 67.6; 340/5 I, 5 H

[56] References Cited

UNITED STATES PATENTS

| | | | |
|---|---|---|---|
| 3,137,837 | 6/1964 | Wreford | 73/67.6 X |
| 2,832,214 | 4/1958 | Trommler | 73/67.6 |
| 3,097,522 | 7/1963 | Weller, Jr. | 73/67.6 |
| 3,400,363 | 9/1968 | Silverman | 340/3 |

OTHER PUBLICATIONS

Young et al., A New Recording Technique for Acoustic Holography, Applied Physics Letters, Nov. 1, 1967, p. 294–296.

*Primary Examiner*—Richard C. Queisser
*Assistant Examiner*—John P. Beauchamp
*Attorney*—Woodcock, Washburn, Kurtz and Mackiewicz

[57] ABSTRACT

A thin cell is disclosed which utilizes a pair of membranes transparent to both ultrasonic and light energy and containing therebetween particles suspended in a liquid matrix, the particles migrating from areas of high ultrasonic pressure to areas of low ultrasonic pressure when the medium is irradiated with ultrasonic energy. The intersection of two coherent ultrasonic beams at a finite angle therebetween generates an interference pattern containing fixed pressure nodes which may be detected by placing the suspended particle cell at the area of beam intersection. If one of the intersecting ultrasonic beams is modified by an object, the diffraction pattern formed in the cell is an ultrasonic hologram from which an optical image of the object, as viewed by ultrasound, is formed in a diffracted order of coherent light passed through the cell.

17 Claims, 6 Drawing Figures

ULTRASONIC INTERFERENCE PATTERN DETECTOR

BACKGROUND OF THE INVENTION

This invention relates generally to an apparatus for detecting ultrasonic interference patterns, and more particularly to a method and apparatus for translating an information carrying wavefront from the ultrasonic into the optical domain utilizing the process of wavefront reconstruction (holography).

The techniques of holography have recently been successfully carried out with compressional wave energy such as that in the ultrasonic frequency range. In a common application of ultrasonic holography, an object to be examined is irradiated with an ultrasonic energy beam which is modified by the object to form an object-modified beam. A reference beam of ultrasonic energy substantially of the same frequency as the object illuminating ultrasonic energy is interfered with the object-modified ultrasonic beam to form an interference pattern which contains both intensity and phase information of the object-modified beam. The interference pattern is utilized to modulate a light beam to form in the optical domain a wavefront that is a scaled replica in both intensity and phase of the object-modified ultrasonic beam, thereby forming an image of the object, as examined with ultrasonic energy, which may be visually observed. The techniques of ultrasonic holography are explained in more detail in copending patent application Ser. No. 569,914 by Byron B. Brenden.

The aspect of ultrasonic holography wherein several different approaches have been taken is in detecting the interference pattern and converting this detected information into an ultrasonic hologram for diffracting a light beam. Many techniques for this are described in the literature (including patent publications) and the technique chosen in any given instance is the one with the most advantages for that particular application. One technique of detection which has been found preferred for many applications is a liquid-air interface, described in the aforementioned copending patent application Ser. No. 569,914. The intersection of the object-modified and reference ultrasonic beams takes place at the upper surface of a contained liquid, thereby deforming the surface according to the interference pattern of the two beams. The ultrasonic pressure acting on the surface is counteracted by its surface tension and forces of gravity. When light is shone upon such a surface ripple pattern, at least one diffracted light order is formed in reflection therefrom which contains a replica of the object-modified ultrasonic wavefront striking the liquid surface. A liquid surface ultrasonic detector is very sensitive and allows carrying out ultrasonic holography in real time; that is, a three-dimensional optical image of the object as seen by ultrasound is formed concurrently with the examination thereof. This detector suffers, however, from a disadvantage when utilized in certain types of environments. A liquid-surface detector must be leveled horizontally and carefully controlled in that position. This limits the usefulness of such a detector to mechanically stable environments.

Long before the invention of ultrasonic holography, a suspended platelet cell in one form was utilized for direct ultrasonic imaging (non-holographic imaging). An object is irradiated with ultrasonic energy and the object-modified beam is focused by an ultrasonic lens into a suspended platelet cell through one side thereof. Each platelet orients itself with its broad reflective surface substantially parallel to the resultant ultrasonic wavefront at the location of the platelet. If these platelets are illuminated by light from a side of the cell opposite the side from which the ultrasound enters, the light is reflected from the particles with an intensity distribution providing a visual outline of the object irradiated with ultrasound. Such a direct imaging system is illustrated in the book Sonics, by Huetter and Bolt (1955), at page 353. The platelets suspended in such a cell must be specularly reflective in order to operate properly. Such a cell is commonly termed a "Pohlman cell" and is extensively discussed in various forms thereof in the literature, including Dutch Pat. No. 48,400 (1940). Use of a Pohlman cell with aluminum flakes has been described recently in the Japan Electronic Engineering, Nov., 1968, Pages 66–68.

A suspended particle cell of another type has been used with ultrasonic energy to form a standing pressure wave pattern for diffracting light which passes through the cell in a direction perpendicular to the propagation of the ultrasonic energy. Such ultrasonic diffraction cells are discussed in the literature, such as in the Italian Periodical Il Nuovo Cimento at the following pages: Issue dated Jan., 1953, Pages 98–102; issue dated Nov., 1955, Pages 898–906; and the issue dated Feb., 1956, Pages 371–376.

It is a primary object of this invention to provide improvements in area detectors of interference patterns with utility in ultrasonic holographic imaging.

It is a further object of this invention to provide an ultrasonic area detector and hologram that is not limited to horizontal orientation and which is physically more rugged than a liquid-air interface detector.

It is also an object of this invention to provide an ultrasonic interference pattern detector and hologram which uses image reconstructing light with improved efficiency and further to provide a detector which forms a hologram that may be photographed easily.

SUMMARY OF THE INVENTION

These and additional objects are accomplished according to this invention by an area detector of an ultrasonic interference pattern containing fixed nodes which is constructed with a pair of very thin membranes tightly stretched across a frame to form a cavity therebetween that is filled with a two phase medium, one phase in the form of a matrix and the other phase dispersed therein and capable of migrating to spatially fixed nodes of an ultrasonic interference pattern within the cell. Both membranes are substantially transparent to both ultrasonic and light energy. Such a cell has a primary utility in detecting an interference pattern formed by the intersection of two ultrasonic beams entering the cell through one of said pair of membranes and at a finite angle with each other. The phase dispersed within the matrix phase is thereby caused to migrate to the nodes of the interference pattern. The dispersed phase has some different optical property than the matrix phase so that upon passing coherent light illumination through the cell, the light is modulated according to the nature of the fixed nodes of the interference pattern. In the application of ultrasonic holography, one of the two ultrasonic beams contains information of an object under examination and the light passing through the cell is diffracted into at least one first order beam in which a three-dimensional image of the object may be observed.

An area detector according to this invention is not limited to a horizontal orientation as with other detectors but may be oriented in any direction with respect to the force of gravity, including a normally preferred vertical direction. Additionally, such a cell is physically more rugged than a liquid-air interface detector and is especially useful for holographic investigation of inanimate objects with ultrasonic energy by use of portable equipment in the field. Additionally, such a cell is useful over a wide ultrasonic frequency range. An area detector according to this invention detects an ultrasonic interference pattern and optically displays such a pattern in the form of a hologram. Furthermore, an area detector according to this invention may be completely submersed in an ultrasonic transmitting liquid medium and is not limited to use at the surface thereof.

By "two phase medium" as used herein is meant a non-homogeneous mixture of matter in which two components are mechanically separable one from the other. The dispersed phase is characterized by a different optical property than the matrix phase so that the migration of the dispersed phase to the nodes of an interference pattern forms an optically readable pattern. For instance, the dispersed phase may have a degree of opaqueness or a refractive index which is different from that of the matrix phase. In a preferred form of the ultrasonic area detector according to this invention, the dispersed phase includes finely divided solid particles suspended in a matrix phase which is a liquid characterized by substantial optical clarity. The matrix liquid is chosen to be a good acoustical match with the fluid which surrounds the cell during operation thereof. It has been found that the matrix liquid should have a low viscosity to allow rapid migration of particles to positions within the cell corresponding to fixed nodes of the interference pattern, and additionally should have a high dipole moment which helps to keep the particles suspended therein for a sufficiently long period of time. More particularly, it has been found that the ratio of the dipole moment to viscosity of the matrix liquid should be greater than that for water. The particles can be most anything within a size range appropriate for the ultrasound frequency utilized and it has been found that for better migration in response to ultrasound, the particles should have some aspect ratio such as a length which is about five times its thickness. Preferred materials have been found to be aluminum flakes as the dispersed phase and acetonitrile for the matrix phase. This combination of materials has been found to require about two seconds for the particles to migrate to the fixed nodes of the interference pattern. This combination of materials can be used to detect an interference pattern for 30 minutes or more without the particles settling out. This migration time is shorter and the settling time longer than that accomplished with the use of aluminum flakes in water.

The pair of membranes is preferably constructed of a synthetic polymeric material of a thickness less than 3 mils for an ultrasonic operating range of 1–10 megahertz. These membranes are stretched somewhere within their elastic range to prevent a distortion of these membranes upon the influence of the weight of the two phase medium. The distance between the membranes, which is the thickness of the operative portion of the suspended particle cell, should be thin enough so that light may pass through the cell after the particles have migrated to the interference pattern nodes. Since these particles in certain applications may line up across the cell in a direction which is not perpendicular to the membranes, excessive thickness could block all the light from passing therethrough and thereby prevent an optical reconstruction. Generally, this thickness should be less than 10 times the wavelength of ultrasound for which the cell is designed to be utilized to allow light transmission therethrough.

According to an additional aspect of the present invention, a photograph may be made of the light pattern formed by the suspended particles after migrating to the fixed nodes. There is good optical contrast in the suspended particle cell. Reflected light from the cell may even be used to take the photograph if the suspended particles are reflective. The photograph is then a permanent hologram from which a visual image may be reconstructed at a later time according to the techniques of optical holography. A permanent hologram has a further advantage in situations where the diffraction pattern formed by the suspended particles consists of widely spaced lines with poor light diffraction efficiency. The permanent hologram may be optically reduced in size from that of the suspended particle hologram prior to reconstructing an image therefrom, thereby reducing the spacing of the diffraction pattern.

For a more detailed disclosure of the invention and for further objects and advantages thereof, reference should be had to the following description taken in conjunction with the drawings.

DESCRIPTION OF THE PREFERRED EMBODIMENTS

Figure 1:
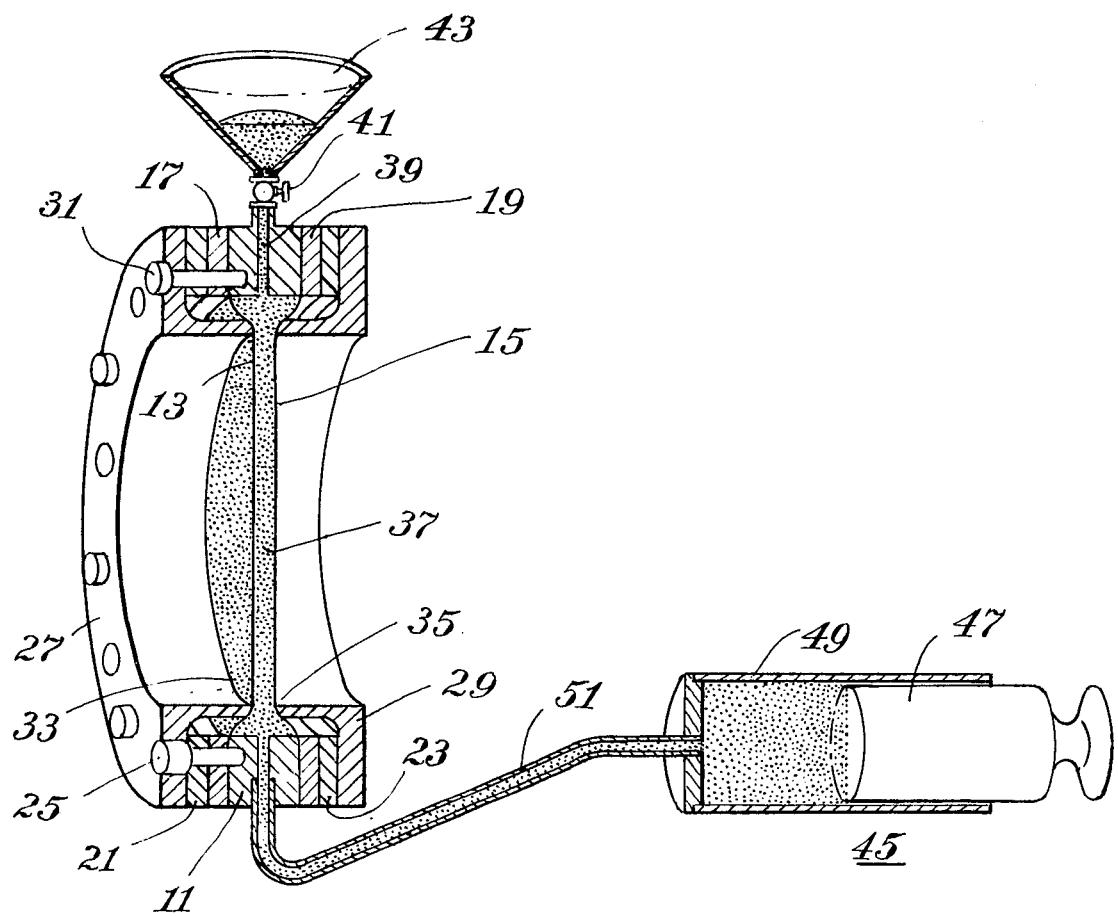
FIG. 1 illustrates in cross-section a preferred embodiment of the ultrasonic area detector according to this invention.

In FIG. 1, an inner supporting ring 11 has firmly attached thereto a pair of membranes 13 and 15 with the help of a pair of gaskets 17 and 19 and a pair of clamps 21 and 23. The gaskets and clamps are caused to assert a bearing force against the inner supporting ring 11 by fasteners such as a pin 25. Two outer rings 27 and 29 are firmly attached to the inner supporting ring 11 through fasteners such as the pin 31. The outer rings 27 and 29 contain respectively flanges 33 and 35 of a width with respect to other elements of the cell to cause the membranes 13 and 15 to be under tension within the material's elastic region. This prevents the membranes 13 and 15 from substantially deforming from a plane surface due to the weight of the medium contained therein. Maintaining the membranes 13 and 15 in a plane surface becomes important when ultrasound travels at a different speed in the material contained therebetween than in a liquid medium in which the detector cell is utilized, thereby preventing undesired refraction. The membranes 13 and 15 are chosen for physical stability under tension and also for low losses to ultrasonic energy. They are also substantially transparent to light energy. Various synthetic polymeric films have been found satisfactory and a one mil film of polyethylene terephthalate is preferred for use with ultrasonic frequencies within the range 1–10 megahertz.

The cavity formed by the two membranes 13 and 15 with the inner surface of the inner supporting ring 11 is filled with a two phase medium 37. One of the phases includes a substantially light transparent liquid matrix such as acetonitrile ($C_2H_3N$) and the dispersed phase includes aluminum flakes. A wide range of other specific materials may be used but this combination has been found to be preferred. For instance, the liquid matrix may be chosen to be soapy water, methyl alcohol, ethyl alcohol, or acetone in combination with a dispersed phase of aluminum flakes. Also, the dispersed phase may be graphite, mica flakes, rutile needles, starch or egg albumin in a soapy water liquid matrix. There are a number of other materials in various combinations which may be utilized. Furthermore, the choices are not necessarily limited to finely divided particles suspended in a liquid but may also be, for example, a liquid phase dispersed in a liquid matrix. Among the important considerations in choosing materials is that one not be soluble in the other and that the dispersed phase migrate quickly when irradiated with ultrasound without settling out of solution in a period of time less than that desired for retention of the formed standing wave diffraction pattern. To obtain these results, the ratio of the dipole moment to the viscosity of the liquid matrix should be as high as possible and at least greater than that of water. A preferred combination of aluminum flakes in acetonitrile has been found to have these characteristics. Aluminum flakes with an aspect ratio of about 5 to 1 have been found satisfactory. For example, the aluminum flakes preferably have a maximum dimension of a few microns (less than 10 microns with a thickness of 1 micron) for use with ultrasonic energy within or near a frequency range of 1–10 Mhz.

As a means of filling the space between the membranes with the two phase medium 37, an opening 39 is provided in the inner supporting ring 11 which has attached thereto a valve 41 and a funnel 43. After the two phase medium 37 is in place, the valve 41 is shut off. It should be noted that aluminum flakes will settle out of the liquid matrix due to the force of gravity after the two phase medium sets for a period of time. Therefore, in order to maintain the aluminum flakes suspended in a liquid matrix, a pump 45 including a hand driven piston 47 and a cylinder 49 is connected to another opening through the inner supporting ring 11 by a tube 51. Reciprocating the piston 47 causes a turbulence within the two phase medium 37 between the two membranes which disperses the particles throughout.

Figure 2:
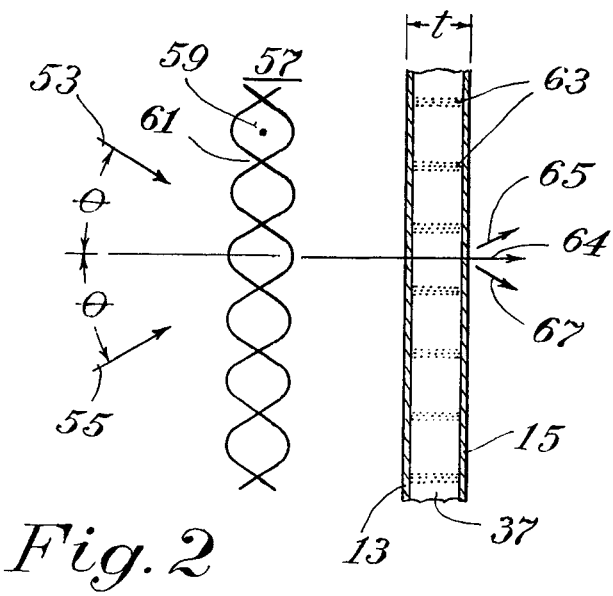
FIG. 2 schematically illustrates an operation of the ultrasonic area detector shown in FIG. 1.

The operation of the suspended particle cell of FIG. 1 is illustrated in FIG. 2. Two beams of ultrasonic energy of the same frequency indicated by arrows 53 and 55 are caused to intersect and thereby interfere in a volume in which that portion of the suspended particle cell including membranes 13 and 15 as well as the two phase medium 37 is located. If the ultrasonic beams each make an angle $\theta$ with a normal to the ultrasonic cell, a symmetrical interference pattern containing fixed nodes will be generated from the interference of the two beams, as is indicated by the graph 57. The graph 57 represents a pressure distribution within the suspended particle cell. A particle initially suspended at a position 59 will migrate from this high pressure area to a low pressure area, such as to a node 61, after the pressure wave has been established for a short time. As a result, dense particles suspended in the two phase medium 37 migrate to the fixed nodes of the pressure distribution established by the interfering ultrasonic beams to form opaque bars with transparent spaces therebetween. These opaque bars form a diffraction pattern so that when light as represented by the arrow 64 is passed through the suspended particle detector, the light will be diffracted into first order beams represented by the arrows 65 and 67. The nature of the diffracted first order beams depends upon the spacing of the opaque bars of aluminum particles 63 which in turn depends upon the frequency of the ultrasound striking it and the angle between the two interfering beams. Therefore, certain characteristics of the ultrasonic energy may be determined by the nature of the light diffracted in the suspended particle cell.

When a suspended particle cell as described with respect to FIG. 1 is utilized as an ultrasonic hologram detector, one of the interfering ultrasonic beams (shown more clearly in FIGS. 3 and 4) will contain object information so that all rays do not travel along the same path precisely at an angle $\theta$ with the normal to the suspended particle cell. Therefore, the opaque cluster 63 of aluminum particles will not remain normal to the membranes 13 and 15 as shown in FIG. 2 but will orient themselves at various angles to the normal depending upon the nature of the object information. Therefore, it is important that the thickness of the suspended particle cell "t" between the membranes 13 and 15 be small enough so that light may travel normal to the membranes 13 and 15 through the cell between each of the opaque clusters 63. A good design criterion has been found to limit the cell thickness to ten times the wavelength of ultrasound with which it is to be used.

Figure 3:
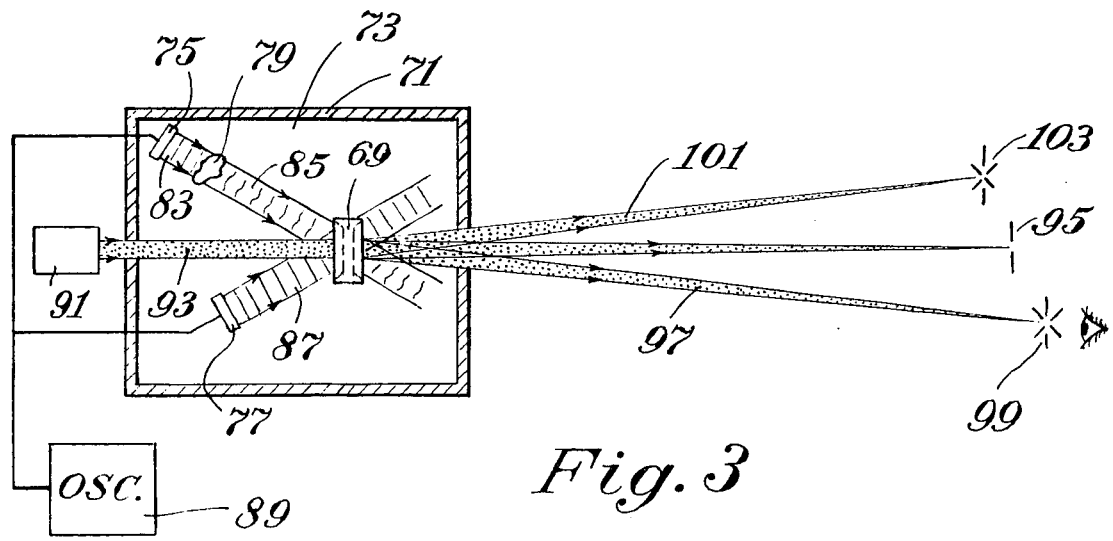
FIG. 3 illustrates in schematic form the use of an ultrasonic area detector according to this invention as a hologram from which an image of an object, as seen by ultrasound, may be reconstructed.

FIG. 3 shows a suspended particle cell according to FIG. 1 used as a detector in ultrasonic holography. A suspended particle cell 69 is attached to a tank 71. An ultrasonic transmitting liquid medium 73 (generally water) is contained by the tank 71 with ultrasonic energy transducers 75 and 77 as well as an object 79 under investigation immersed in the liquid 73 for efficient coupling of ultrasonic energy to the suspended particle cell 69 without significant energy reflections upon entering and leaving the cell. To prevent reflections of ultrasound back into the cell at the outer membrane thereof, the cell is positioned with a significant amount of the liquid 73 contacting the outer membrane to carry the ultrasonic energy away from the suspended particle cell 69. The transducers 75 and 77 are preferably made of flat X-cut quartz crystals.

The transducer 75 generates an object beam 83 which strikes the object 79 to produce an object-modified beam 85 which strikes the detector. The transducer 77 generates a reference beam 87 which interferes with the object-modified beam 85 at the suspended particle cell detector. The transducers 75 and 77 are preferably electrically driven by a common electronic oscillator 89 to produce the object beam 83 and the reference beam 87 coherent with each other.

To translate information of the object 79 as read by ultrasonic energy into the optical domain, light is passed through the suspended particle detector 69. A coherent light source 91 which includes appropriate beam expanding optics generates a light beam 93 which is directed through the diffraction pattern formed on the suspended particle detector 69. For viewing the images directly either by eye or other photosensitive device, the optics associated with the light source 91 preferably generate a converging light beam 93 which comes to focus at some appropriate plane 95 in space. The light diffraction pattern formed in the suspended particle cell by opaque clusters of the aluminum particles cause diffraction of a portion of intensity of the light beam 93 into a first order diffracted beam 97 which forms an actual image 99 of the object in space, and also into another first order diffracted beam 101 which forms a conjugate image 103 in space. The actual image 99 may be viewed directly by the eye or may be viewed by some photosensitive device such as a camera or television vidicon tube. The conjugate image 103 may be of interest in certain applications and may be similarly viewed.

Figure 4:
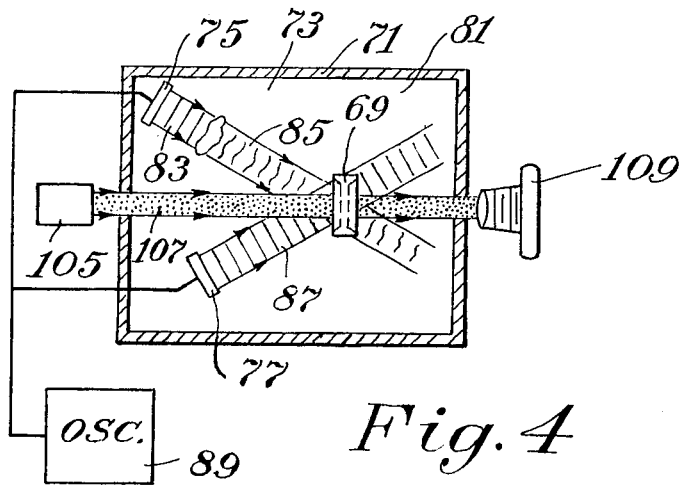
FIG. 4 shows another holographic application of an ultrasonic area detector according to the present invention wherein a permanent hologram is constructed by photographing the diffraction pattern formed therein.

It may be desired to photograph the diffraction pattern formed by the opaque clusters of aluminum particles to form a permanent hologram for later construction of an image or images. FIG. 4 shows a system for carrying this out and contains many of the elements of FIG. 3 which carry the same reference numbers. A primary difference in FIG. 4 is that a light source 105 need not be coherent. Furthermore, a light beam 107 produced thereby need not have its convergence carefully controlled. To record the light passing through the suspended particle detector 69 onto film, a camera 109 is positioned in the light beam 107 and is focused onto the cell 69. The camera 109 could additionally include optics for demagnifying the image so that the dark lines of the diffraction pattern are closer together than would otherwise be the case, thereby increasing the angle of diffraction of the photographed hologram upon reconstruction.

Figure 5:
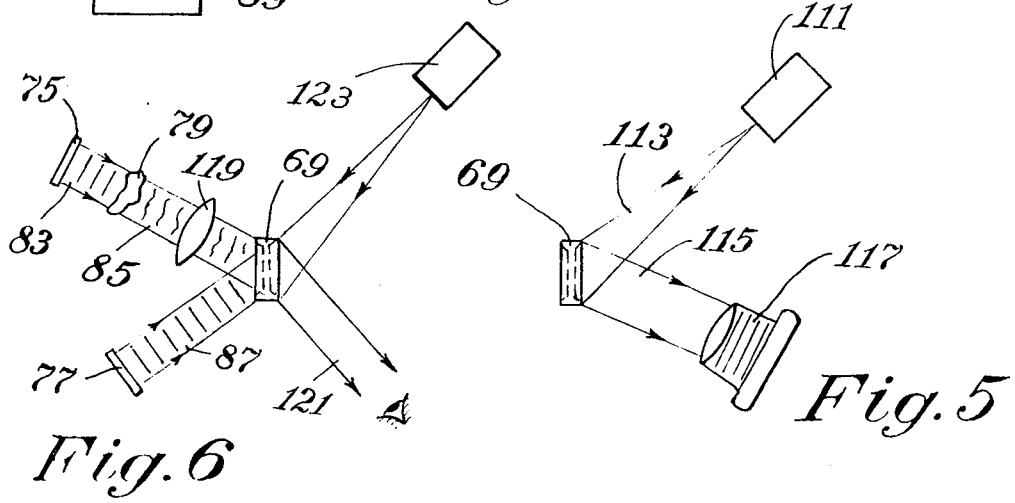
FIG. 5 illustrates a modification of FIG. 4 wherein a permanent hologram is constructed by photographing with reflected light the diffraction pattern formed on an ultrasonic area detector according to the present invention.

If the suspended particles of the detector 69 are reflective, a permanent hologram may be constructed by photographing the pattern formed on the cell by the migrating particles in light reflected therefrom. This modification of the configuration of FIG. 4 is shown in FIG. 5. A light source 111, not necessarily coherent, generates a light beam 113 which illuminates the suspended particle cell detector 69. A light beam 115 is reflected therefrom and a camera 117 placed therein. The camera 117 is focused onto the detector 69.

Figure 6:
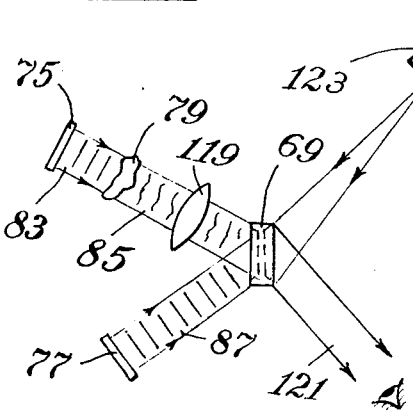
FIG. 6 shows a modification of FIGS. 3, 4 or 5 wherein an ultrasonic lens is included.

Uses of an ultrasonic area detector according to the present invention in ultrasonic holography is not limited to the specific embodiments shown in FIGS. 3 and 4. Many of the improvements and modifications of basic ultrasonic holographic techniques reported elsewhere may be used with this type of detector as well as with other detectors hereinbefore known. Certain improvements in ultrasonic holography are described in a copending application Ser. No. 730,260 by Byron B. Brenden, now U.S. Pat. No. 3,585,847, issued June 22, 1971. Briefly, one of these improvements, as shown in FIG. 6, is to utilize an ultrasonic lens 119 in the object-modified beam 85 between the object 79 and the detecting surface to focus onto the detector the ultrasonic wavefront as it exists in some plane of the object. An optical image of the object is then reconstructed in a first order diffracted beam and located in or near the plane of the hologram detector. If the particles of a suspended particle cell are reflective and an ultrasonic object image is focused therein, an optical image can be observed directly in a suspended particle cell 69 by reflected light 121 from a source 123 that is not necessarily coherent. The combination of such an ultrasonic lens and the improved detector described herein when used with reflected light that is not necessarily coherent has been found to provide very good optical images in the cell.

Any convenient type of ultrasonic lens 119 may be used as shown in FIG. 6, such as the lens described in the aforementioned copending application Ser. No. 730,260. Briefly, the lens described therein includes a frame for holding two thin synthetic polymeric sheets in a manner that a cavity is formed. This is accomplished by a structure that is similar to the detector of FIG. 1 herein. In the lens, the polymeric sheets are held in enough tension by the frame so that upon filling the cavity with an ultrasound refracting liquid under enough pressure to shape the polymeric sheets according to the lens power desired, the polymeric sheets will be stretched within their elastic limit. The stretched sheets provide for smooth incident and exit lens surfaces. A suitable ultrasound refracting liquid for the lens is trichloro-trifluoro-ethane when the lens is used in a liquid medium with ultrasound transmission characteristics similar to that of water.

A further improvement which may be utilized with the detector described herein is insertion of an ultrasonic lens in the reference beam 87 to eliminate certain edge effects of the reference beam transducer 77 which cause undesired noise at the hologram detector.

It shall be understood the invention is not limited to the specific arrangements shown, and that changes and modifications may be made within the scope of the appended claims.

What is claimed is:

1. An ultrasonic system, comprising,
   an area detector of ultrasonic energy which includes:
   a pair of membranes characterized by substantial transparency to both ultrasonic and light energy and held by a frame in a manner to form a cavity therebetween, and a two phase medium within said cavity, one of said phases in the form of a matrix and the other of said phases being dispersed therein, said medium additionally characterized by said dispersed phase being capable of migrating within said matrix phase to conform to an ultrasonic interference pattern and each of the two phases having some different optical property, means for generating two mutually coherent ultrasonic energy beams and for directing said beams through said pair of membranes of said area detector in a manner that said beams intersect at a finite angle with each other in said cavity between said pair of membranes, thereby generating an interference pattern therein, whereby said dispersed phase migrates to conform to said ultrasonic interference pattern, and means for illuminating said detector with light energy.

2. An ultrasonic system according to claim 1 wherein said means for illuminating said detector with light energy includes means for directing a beam of coherent light through both of said pair of membranes of said detector, whereby said coherent light beam is diffracted into various orders depending upon the nature of the interference pattern.

3. An ultrasonic system according to claim 1 wherein said matrix phase of said area detector consists of a liquid which is characterized by substantial optical clarity.

4. An ultrasonic system according to claim 3 wherein said dispersed phase of said area detector includes a large number of opaque finely divided solid particles.

5. An ultrasonic system according to claim 2 wherein one of said intersecting ultrasonic beams has an object placed in the beam path, whereby said area detector displays an ultrasonic hologram which causes said coherent light beam passing through said cell to be diffracted in a manner that at least one diffracted order contains an optical image of said object.

6. An ultrasonic system according to claim 1
wherein an object is located in the path of one of said intersecting ultrasonic beams, whereby an ultrasonic hologram including alternate areas of different optical properties is formed upon said area detector, and a camera positioned to record said ultrasonic hologram.

7. A method of forming an optical image of an object illumination by ultrasonic energy, comprising the steps of:

directing an illuminating beam of ultrasonic energy toward an object and thence as an object-modified energy beam toward a hologram detecting plane, simultaneously directing a beam of reference ultrasonic energy toward said detecting plane to intersect with said object-modified ultrasonic energy at a finite angle, said reference energy being mutually coherent with the object illuminating energy, positioning at said detecting plane a contained layer of opaque solid particles suspended in a liquid, whereby said opaque suspended solid particles migrate to nodes of an interference pattern generated at the intersection of said object-modified and reference ultrasonic beams, and illuminating said contained layer of suspended particles with light.

8. A method of forming an optical image of an object illuminating by ultrasonic energy, comprising the steps of:

directing an illuminating beam of ultrasonic energy toward an object and thence to produce object-modified energy, imaging the object-modified energy onto a hologram detecting plane, simultaneously directing a beam of reference ultrasonic energy toward said detecting plane to intersect with the imaged object-modified ultrasonic energy at a finite angle, said reference energy being mutually coherent with the object illuminating energy, positioning at said detecting plane a contained layer of reflecting solid particles suspended in a liquid, whereby said opaque suspended solid particles migrate to nodes of an interference pattern generated at the intersection of said object-modified and reference ultrasonic beams, and reflecting light energy from said particles, whereby an optical image of the object appears in the reflected light.

9. An ultrasonic system according to claim 1 wherein said membranes and frame form only one cavity therebetween, and wherein said dispersed phase is capable of moving within the matrix phase throughout the entire said only one cavity.

10. An ultrasonic system according to claim 1 wherein said matrix phase consists of a liquid and said dispersed phase includes a plurality of opaque solid particles that are free to move in the liquid matrix throughout said cavity.

11. An ultrasonic system according to claim 10 wherein said solid particles include thin flakes having an aspect ratio of about five to one.

12. An area detector according to claim 10 wherein said solid particles include thin aluminum flakes.

13. An ultrasonic system according to claim 1 wherein a minimum distance across said cavity between said membranes is less than ten times the wavelength of said mutually coherent ultrasonic energy beams.

14. An ultrasonic system according to claim 1 wherein each of said pair of membranes is stretched within an elastic region of the membrane.

15. An ultrasonic system according to claim 1 wherein said matrix consists of a liquid characterized by a ratio of its dipole moment to its viscosity that is greater than that of water.

16. An ultrasonic system according to claim 1 which additionally comprises means for detecting said light energy after passing through the area detector, said detecting means and said light energy illuminating means being positioned on opposite sides of said detector.

17. An ultrasonic system according to claim 1 wherein said area detector is oriented with said pair of membranes in generally a vertical position.

* * * * *